Jan. 6, 1953　　　　　A. W. ELSE　　　　　2,624,601
PACKING GLAND

Filed Feb. 13, 1946　　　　　　　　　　　　　　2 SHEETS—SHEET 1

INVENTOR.
ARTHUR W. ELSE
BY John W. Michael
ATTORNEY.

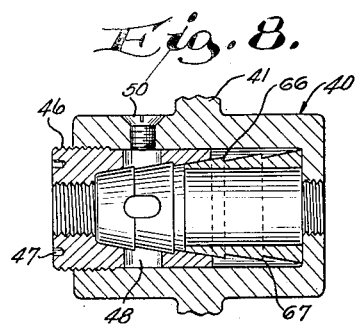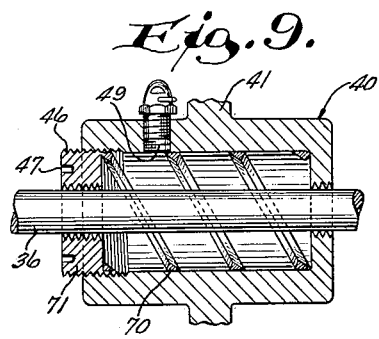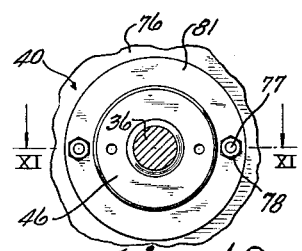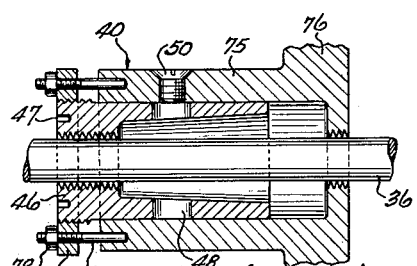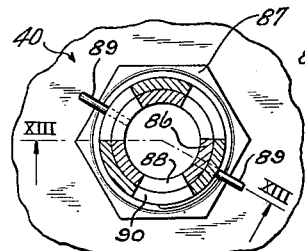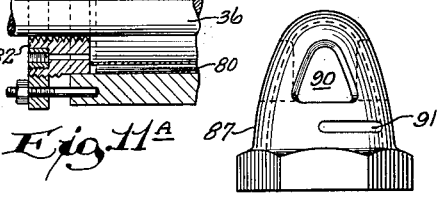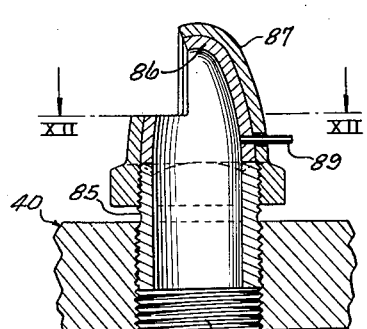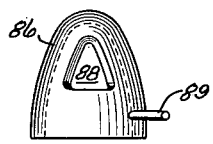

Patented Jan. 6, 1953

2,624,601

UNITED STATES PATENT OFFICE 2,624,601

PACKING GLAND

Arthur W. Else, Milwaukee, Wis.

Application February 13, 1946, Serial No. 647,302

4 Claims. (Cl. 286—38)

This invention relates to improvements in devices for sealing the clearance spaces between the relatively moving parts of machines.

Seals between relatively moving parts of machines are used either for limiting or throttling leakage from the enclosed spaces of the machines under pressure or into such spaces under vacuum, both pressure and vacuum being considered relative to atmospheric pressure. Such leakage may be a matter of retaining a fluid within the machine, or of the prevention of contamination of such fluid, or may be merely a matter of keeping lubricant in place or keeping material having undesirable qualities, such as abrasiveness, out of the space between the relatively moving parts. For example, reciprocating rods and rotating shafts must be sealed at the point of their extension through the casing or chamber containing the piston reciprocated by the rod or the rotor driven by the shaft. In addition, reciprocating pistons must be movably sealed to the walls of their cylinders and various parts must be sealed against the entrance of foreign material between the relatively moving surfaces.

Packings now in use include various materials which are woven or otherwise preformed to given dimensions and shape and are plastic only in the sense that they are deformable or distortable under pressure and may therefore be forced into only partial or approximate contact with the machine surfaces to be sealed. Such deformation of ordinary packings, however, results in localized pressures higher than necessary to withstand the pressure to be sealed and which are frequently responsible for scoring the relatively moving machine parts, and provides other locations with little or no pressure through which leakage may occur. Even when the machine parts are made of a material sufficiently hard to resist scoring, the excessive pressure required for the partial or approximate sealing obtainable with such packings, produces high friction losses between the packing and the machine parts contacting therewith. A particular disadvantage of the ordinary packing is the decrease in pressure in its transmission through the packing from the follower to the surface to be sealed, and regardless of the follower pressure, so that the least pressure is obtained at the joint to be sealed which is the only point at which such pressure is effective. Further, machines packed with deformable packing must be stopped, partially disassembled, repacked and reassembled periodically to secure even the inadequate sealing heretofore obtained.

If the packing material used is such as to flow under pressure to conform to the contour of the parts to be sealed as if the packing were fluid, such fluent or plastic packing tends to transmit the pressure thereon equally in all directions. Hence, the pressure on the part to be sealed tends to be uniform throughout the entire sealing gland and particularly on the relatively moving surface. The pressure does not materially diminish throughout the length of any such fluent or plastic packing between the pressure member and the surface to be sealed and such packing does not produce material friction losses. Particular advantages of such packing are that the composition may be varied as required by the material to be sealed into or out of the machine and that the machine may be packed while in operation so that the seal may constantly be kept in the most effective condition. The use of fluent or plastic packing is most advantageous if each packing gland has a member acting both as a valve for the packing, without clogging regardless of the composition of the packing, and to exert any desired degree of pressure thereon. Such packing is then continuously urged toward the opening between surfaces to be sealed and is applicable to the sealing gland while the machine is in use.

It is therefore an object of the present invention to provide a seal for the relatively moving parts of a machine in which the passage of any material through the clearance space between such parts is to be limited to a negligible value.

Another object of the invention is to provide a seal for the relatively moving parts of machines in which the pressure of a fluent sealing medium on the machine parts is maintained substantially uniform over the entire moving surfaces.

Another object of the invention is to provide a seal for the moving parts of machines in which the pressure-exerting member acts in such direction on a fluent sealing medium as to transmit the pressure therethrough substantially undiminished to the surfaces to be sealed.

Another object of the present invention is to provide a seal for the joint between the relatively moving parts of a machine in which a single member forms a fluent or plastic packing into a homogeneous body without channels or interstices and maintains such homogeneity while acting with a substantially uniform pressure over the entire area of all of the surfaces in contact with the packing, thereby diminishing both the quantity of the packing required and the size of the gland receiving such packing.

Another object of the invention is to provide a sealing gland for the moving parts of machines in which a single member acts both as a collet or valving member for a fluent and plastic packing medium insertible into the gland while the machine is in operation and the joint is under pressure and as the gland pressure exerting member.

A further object of the invention is to provide a sealing gland for the moving parts of a machine in which movement of one member of the gland longitudinally of a part to be sealed equally presses the packing medium both longitudinally and radially toward the surfaces to be sealed.

A further object of the invention is to provide a packing gland with a follower which is so formed as to provide for continuous and positive movement of a fluent packing material toward the joint between the parts to be sealed.

A further object of the invention is to provide a packing gland in which a follower acts to displace another member and thereby equalizes the pressure exerted on the packing medium upon movement of the follower and causes substantially uniform pressure throughout the packing medium.

A further object of the invention is to provide a seal for the joint between the relatively moving parts of machines in which a pressure member acting longitudinally of the part to be sealed causes distortion of a resilient member whereby longitudinal movement of the pressure member is converted into pressure on the packing acting transversely of the part to be sealed.

A further object of the invention is to provide means for modifying the sealing glands of machines now using pre-formed packing to employ a single valving and pressure member whereby the modified seal may utilize fluent or plastic packing.

And a further object of the present invention is to provide means external to the packing gland and co-acting with means internally of the packing gland for valving a fluent and plastic but solid packing into the gland while the machine to be sealed is in operation.

Objects and advantages other than those above set forth will be apparent from the following description when read in connection with the accompanying drawings, in which:

Fig. 8 is a view similar to Fig. 3 and illustrating a fourth modified form of the structure thereof;

Fig. 9 is a sectional view similar to Fig. 3 of another modified form of packing gland and showing a valve through which the fluent packing may be supplied to the gland;

Fig. 10 is an end elevation of Fig. 11;

Fig. 11 is a vertical sectional view showing the manner in which a packing gland now using pre-formed packing may be modified to utilize the present invention;

Fig. 11A is a further modification of the invention utilizing resilient compression members and employing a valved gland and plate similar to structure shown in Figs. 1 and 2;

Fig. 12 is a horizontal sectional view on the plane of line XII—XII of Fig. 13 of the valve generally shown in Fig. 9;

Fig. 13 is a vertical sectional view taken on the broken line XIII—XIII of Fig. 12;

Fig. 14 is an elevation of one of the portions of the structure included in Figs. 12 and 13; and Fig. 15 is an elevational view of another portion of the structure shown in Figs. 12 and 13.

Figure 1:
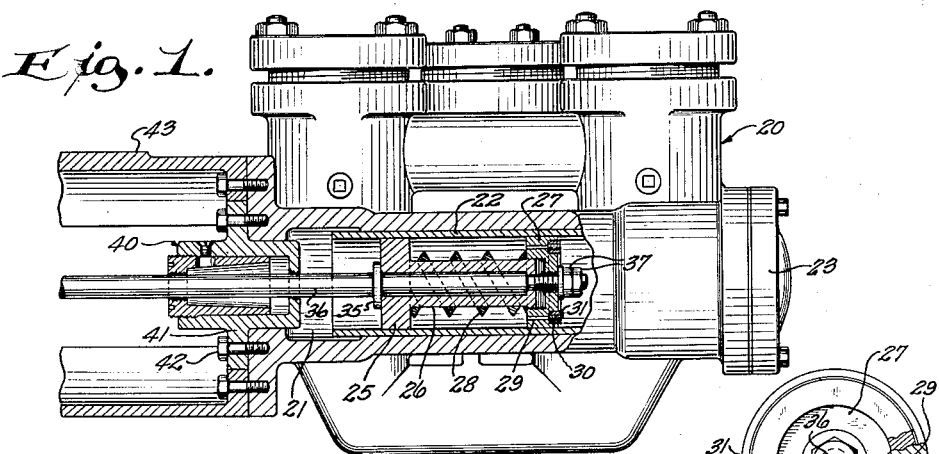
Fig. 1 is a partial sectional and partial elevational view of a reciprocating piston type machine embodying the present invention both for packing a piston movable in its cylinder and for packing the joint formed by passage of a piston rod through the cylinder wall.

Generally the invention may be applied to the sealing of either reciprocating or rotating machine parts relative to other parts such as the reciprocating rod and piston shown, or as rotating shafts and other rotating members. When the invention is applied to either reciprocating or rotating rods or shafts, a box formed as a part of or mounted on the machine receives the rod or shaft and a fluent packing. A member, acting both as a valve and to exert pressure on the packing, has a conical surface translating longitudinal movement of the member into pressure on the packing at an angle to the axis of such longitudinal movement. Increase in packing movement may be obtained by the use of vane cavities or ribs on the follower and multiplication of the pressure may be obtained if the primary member co-acts with a secondary pressure member.

If it is essential that a highly uniform sealing pressure be obtained at all times, a resilient pressure member of a particular shape is used for urging the packing toward the surface of the movable machine parts to be sealed. For such machine parts as pistons or plungers, the use of a resilient pressure member is preferred to avoid the necessity for frequent partial disassembly of the machine for adjusting the pressure on the packing material. The present invention is particularly useful for packing enclosed machine parts, such as pistons which may be repacked through one of the head portions as desired.

Referring particularly to the drawings, the reference numeral 20 generally designates a reciprocating piston type machine, such as a compressor, having one or more cylinders 21. The major portion of such machines being generally of relatively soft material such as cast iron, the cylinder is shown as being provided with a liner 22 and closed at one end by a head 23. The piston according to the present invention comprises a member 25 substantially fitting into the cylinder and forming one of the piston head surfaces and has a boss or stem 26 of reduced size extending therefrom for receiving the other piston surface or head 27. A spring 28 of substantially triangular cross section seats on the stem 26 and is kept under compression between the piston heads 25 and 27. The piston head 27 is provided with a plurality of apertures 29 from the space about the piston stem and ending in a circular groove formed in such piston head. The groove is threaded to receive a ring 30 having one or more apertures 31 therethrough which may be brought into registry with the apertures 29 for the purpose of permitting a fluent and plastic packing to be pumped into the space about the spring 28.

The position of the piston head 27 on the stem 26 is adjusted by threading the head on the stem and is fixed by clamping the piston parts between a flange 35 on a piston rod 36, which extends through the piston portion 25, the stem 26 and the piston portion 27, and between nuts 37 threaded on the end of the piston rod, as shown.

The piston rod extends through one wall of a packing gland box 40 also forming one wall of the cylinder 21 and, when intended to be removable, is flanged as at 41 for mounting, as by screws 42, on the machine. The flange 41 is preferably so made as to fit into the end wall of a removable spacer 43 between the portion 20 of the machine shown, and other portions thereof. The box substantially defines a circular space 45 into which is relatively closely fitted a cup-shaped valve and packing follower 46 with its interior surface shaped as a frustum of a cone. The follower (see Fig. 3) is threaded into the packing box for movement into and out of the box, as desired, by means of a suitable tool engaging in sockets 47 in the end portion of the valve follower. The valve follower is formed with a hole through the end wall thereof for extension of the piston rod 36 therethrough and has elongated openings 48 in the side wall which may be brought into registry with one or more openings 49 in the box 40. The openings 49 in the box are threaded to receive the threaded coupling of any well-known type of grease gun or other pressure device and may be closed by a threaded plug 50 or may be provided with a fitting to be described.

The piston shown is packed by backing the piston head 27 to its extreme limit position on the piston boss without disengagement of the threads, turning the ring 30 to bring the apertures 29 and 31 into registry, and then pumping fluent packing into the space between the piston heads. The ring 30 may then be turned to shut off the apertures through the piston head 27 and such piston head may be turned back to a given position and locked by the nuts 37. The spring 28 is then compressed into a smaller space than the space occupied during the packing process and its side surfaces act on the packing to force the packing outwardly toward the walls of the cylinder thus sealing the clearance space between the piston and the cylinder.

When the valve follower 46 is in place, and one of its openings 48 is in registry with the opening in the box 40, a fluent or plastic packing may be forced into the packing box under pressure. Such packing is preferably composed of a mixture of metal or metal alloy particles of low friction, such as babbit, and an absorbent material, such as saw-dust or wood chips, and a grease preferably mixed with graphite. The valve 46 is then threaded into the box sufficiently to place the entire mass under pressure and acts as a packing follower. The pressure exerted on the packing by the valve follower is substantially perpendicular to the interior surfaces of the valve follower and is transmitted through the packing equally in all directions, as is true of any fluid. Hence, the pressures on the gland surfaces and on the piston rod surface are uniform. Such uniformity of pressure is maintained regardless of the degree of pressure required to prevent leakage of any material along the piston rod.

Figure 3:
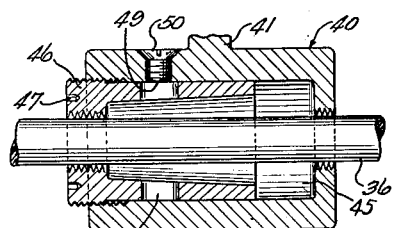
Fig. 3 is an enlarged view of the piston rod packing gland shown in Fig. 1.
Figure 4:
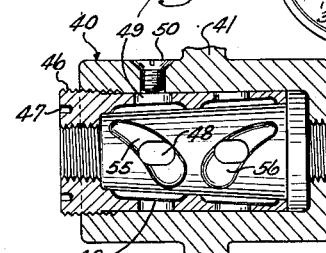
Fig. 4 is a view similar to Fig. 3, but of a modified form of piston rod packing gland.

The modification shown in Fig. 4 is similar to that of Fig. 3 above described, except for sets of similar cavities 55 and 56 formed in the interior surface of the valve follower and acting as vanes in re-directing the mass of the packing back toward the piston rod as movement of the piston rod tends to press the material outwardly therefrom. It will be seen that the vane cavities 55 and 56 are substantially in the shape of one half of a stream-lined body and are directed at an angle toward each other. The valve openings 48 are preferably formed in both sets of vane cavities 55 but are formed at least in those cavities which are adjacent to the partially closed end of the valve follower.

Figure 5:
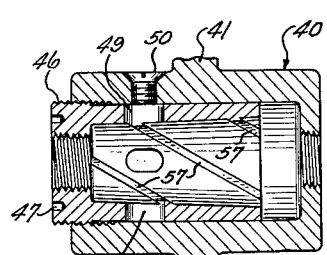
Fig. 5 is a view similar to Fig. 3 of a second modified form of piston rod packing gland.

The modification shown in Fig. 5 is similar to that shown in Fig. 4 excepting that the vane cavities 55 and 56 are replaced by spiral ribs 57 extending from the inner surface of the valve follower in such directions as to perform the function described above for the vane cavities. It will be seen that the ribs 57 are actually only partial ribs and hence form a series of ribs extending from various portions of the interior valve surface.

Figure 6:
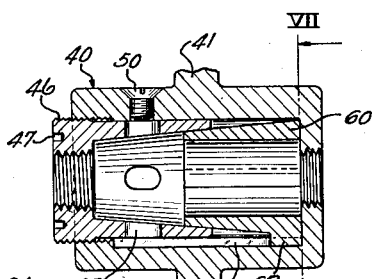
Fig. 6 is a view similar to Fig. 3 of a third embodiment of the piston rod packing gland.
Figure 7:
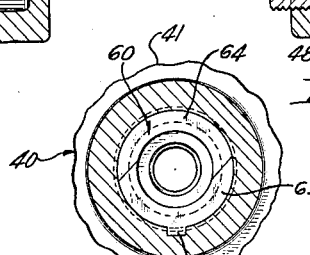
Fig. 7 is a cross sectional view taken on the plane of the line VII—VII of Fig. 6.

In the modification shown in Figs. 6 and 7, the action of the valve follower 46 is supplemented and multiplied by a secondary pressure member 60 having a conical exterior surface and a substantially cylindrical interior surface. In the present construction, the pressure member 60 is provided with a projection 62, fitting into a groove 63 in the box 40 to prevent all possibility of relative rotation of the pressure member with respect to the box even though the friction between the packing and the rod is negligible. The secondary member 60 is preferably divided into two or more portions 64 and 65, as shown in Fig. 7, by surfaces non-radial to the valve 46 and rod 36. The secondary member fitting into the primary member or valve as shown, movement of the primary member inwardly in the box displaces the secondary member half portions relative to each other and decreases the cross sectional area of the secondary member. It will be apparent to those skilled in the art that a relatively small movement of the primary valve follower produces both its own increase in pressure on the mass of packing and decreases the area within the secondary member thereby producing a considerable increase in the pressure exerted on the packing with relatively small movement of the valve.

The modification shown in Fig. 8 is similar to the primary valve follower and secondary pressure member construction described above, excepting that the interior surface of the valve 46 and the corresponding exterior surface of the member 60 are formed as sections of a plurality on cones of similar angles, as indicated at 66 and 67. In the present construction, the secondary member is again divided into two or more portions for the purpose of permitting decrease of the peripheral length of the secondary member until such secondary member is entirely seated in the primary valve follower as it is moved into the box.

In the modification shown in Fig. 9, the box 40 receives a spring 70 which is of substantially triangular cross section having one side thereof seating on the interior cylindrical surface of the box and having the ends thereof seating on the end of the box and on a follower 71 respectively. In the present construction, threading of the follower 71 into the box 40 compresses the spring 70. Such compression of the spring 70 increases the mass of spring material per unit of volume in the packing gland and thereby increases the pressure on the packing. The spring 70 of the present figure is shown as being placed opposite to its placement in Fig. 1. Hence, the action of the spring on the mass of packing in the present construction is opposite to that described above with respect to Fig. 1 and the mass of packing is forced inwardly toward the piston rod 36, upon compression of the spring, rather than outwardly against the cylinder wall, as described with respect to Fig. 1.

Figs. 10 and 11 show how the present invention may be readily applied to existing machines with the minimum change in such existing structures. Such machines generally have a packing gland box 75 formed integral with the remainder of the machine indicated at 76 and are provided with a follower adjustably mounted on the box as by the studs 77 receiving the nuts 78. Such followers have a boss portion extending into the box to distort the pre-formed packing when the follower is drawn up on the studs. To utilize the present invention in such structure, it is merely necessary to replace the usual follower by an annular plate 79 which is adjustably mounted on the studs 77 and is internally threaded to receive a threaded portion of the valve pressure member 46 extending out of the packing box. The member 46 can then be adjusted both by drawing the plate up on the studs and by adjusting the valve follower 46 within the plate. Of course, it is also necessary to provide the box with an aperture 49 and a plug 50 or a fitting to be described, to provide means whereby the fluent packing may be placed in the gland while the machine is in operation.

Figure 2:
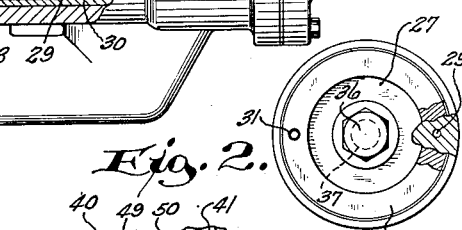
Fig. 2 is an end elevation of one of the piston heads in Fig. 1.

Another adaptation of the present invention to the packing glands of existing machines is shown in Fig. 11A in which a spring 80 is placed within the packing gland box 40 and is shielded from the packing by a member 81. The spring is similar to the split cylindrical and corrugated or sinuous type of expanding leaf springs such as are used in expanding piston rings into contact with their cylinder walls. The spring is of an axial length somewhat less than the internal length of the gland 40 and of a peripheral length to allow the spring to seat on the gland box wall while retaining the ends of the spring in overlapping relation. The shield 81 is preferably a split resilient metal cylinder of a peripheral length to keep the ends in overlapping relation at all times, as indicated, and is slightly longer axially than the spring. The packing valve-follower 46 of Fig. 11 is replaced by an end plug 82 made similar to the piston head 27 of Figs. 1 and 2 with apertures for registry with apertures in a ring 83 threaded into the end plug, as is the case with ring 30 of Figs. 1 and 2. When the structure is assembled, the shield and spring are placed in the box 40 in their contracted form and the end plug is drawn up to provide only relatively small clearances for movement of the shield ends relative to the adjacent stationary surfaces. When fluent packing is forced into the present gland through the end plug, both the shield and the spring are expanded until the spring seats on the gland box wall and the shield seats on the corrugations of the spring, the shield preventing the packing from entering the spring corrugations and interfering with the spring action. The packing is then under the compressive force of both the spring and the shield, is pressed directly on the rod 36, and flows toward the apertures through which the rod passes both into and out of the packing gland. It will be understood that the structure above described may also be utilized in replacement of the usual compression packing rings of a piston, may be applied to packing the end closure of packing glands, and to the packing of any other relatively moving parts in which one of the parts may be formed with a groove in which a spring and a shield may be seated and in which packing may be received for compression by the spring and shield.

Figs. 12, 13, 14, and 15 illustrate a fitting or valve design which may be applied to any one of the various gland constructions above described, and which is particularly adapted for use with the packing mixture hereinabove described. Such fitting comprises a nipple 85 threaded into the opening 49 in the box 46, a valve member 86 seating on the exterior end of the nipple and a valve enclosure or body 87 threaded on the nipple 85 and retaining the end of the valve in contact with the end of the nipple. The valve 86 is provided with a plurality of openings 88 and with one or more pins 89 projecting from the exterior surface of the valve. The valve body 87 is formed with openings 90 substantially corresponding in shape and size to the openings 88 and with slots 91 providing apertures through which the pins 89 project so that the valve may be moved relative to the valve body to bring the openings 88 and 90 into or out of registry as desired. The present construction is particularly adapted for use with the well-known "grease" guns or other pressure devices in which the discharge opening is surrounded by a substantially semi-spherical cavity which may seat on the valve body 87 and, when the openings 88 and 90 are in registry, may be employed to force the packing mixture above described into the packing gland.

Although but a few embodiments of the present invention have been illustrated and described, it will be apparent to those skilled in the art that various changes and modifications may be made therein without departing from the spirit of the invention or from the scope of the appended claims.

I claim:
1. In a device for sealing the joint between relatively movable machine parts, a box having a movable machine part extending therethrough and having an aperture through a wall thereof, and an interiorly conical surfaced follower rotatable in the box for axial movement thereinto, the follower having a plurality of apertures through the side thereof severally movable into and out of registry with the box aperture upon rotation of the follower in the box, registry of the box aperture with a follower aperture providing a passage for admission of the fluent packing into the follower, the follower inner surface exerting both radial and axial pressure on the packing upon movement of the follower for non-registry of the apertures and axially into the box.

2. In a device for sealing the joint between relatively movable machine parts, a box having a movable machine part extending therethrough and having an aperture through a wall thereof, and an interiorly conical surfaced follower rotatable in the box for axial movement thereinto, the follower having an aperture through the side thereof movable into and out of registry with the box aperture upon rotation of the follower in the box, registry of the box aperture with the follower aperture providing a passage for admission of fluent packing into the follower, the follower inner surface having cavities therein for exerting pressure on the packing at an angle to the axis of the follower upon movement of the follower for non-registry of the apertures and axially into the box.

3. In a device for sealing the joint between relatively movable machine parts, a box having a movable machine part extending therethrough and having an aperture through a wall thereof, and a cup-shaped follower rotatable in the box for axial movement therein, the follower having an interior generally conical surface with spiral ribs extending therefrom, the follower having a plurality of apertures through the side wall thereof registering severally with the box aperture upon rotation of the follower in the box and for admitting fluent packing therethrough into the follower, the ribs pressing the packing toward the surface of the rod upon axial movement of the follower in the box to bring the apertures therein out of registry with the box aperture.

4. A seal for the joint between relatively moving machine parts comprising a box having a movable machine part extending therethrough and having an aperture through a wall thereof, a cup-shaped follower movable in the box and of a substantially cylindrical form and slidably fitting into the box and having a conical inner surface extending about the movable machine part, the follower having a plurality of apertures therethrough registrable with the box aperture, and a plate adjustably mounted on the box and adjustably supporting the follower, rotary adjustment of the follower moving the box and the follower apertures into and out of registry with each other whereby a fluent packing may be admitted to the box and a pressure may be exerted on the packing material in the box.

ARTHUR W. ELSE.

REFERENCES CITED

The following references are of record in the file of this patent:

UNITED STATES PATENTS

| Number | Name | Date |
|---|---|---|
| 146,750 | Colby | Jan. 27, 1874 |
| 387,900 | Mills | Aug. 14, 1888 |
| 866,062 | Pierce | Sept. 17, 1907 |
| 934,289 | Dailey | Sept. 14, 1909 |
| 1,239,132 | Smith | Sept. 4, 1917 |
| 1,558,925 | Rogers | Oct. 27, 1925 |
| 1,805,155 | Weeks | May 12, 1931 |
| 2,307,346 | Allen | Jan. 5, 1943 |

FOREIGN PATENTS

| Number | Country | Date |
|---|---|---|
| 18,104 | Great Britain | Sept. 7, 1899 |
| 552,859 | Germany | June 18, 1932 |